United States Patent [19]

Chaudhuri

[11] Patent Number: 4,980,419
[45] Date of Patent: Dec. 25, 1990

[54] ALKYL VINYL ETHER POLYMERS CONTAINING A LACTAM FUNCTIONALITY

[75] Inventor: Ratan K. Chaudhuri, Butler, N.J.

[73] Assignee: GAF Chemicals Corporation, Wayne, N.J.

[21] Appl. No.: 374,701

[22] Filed: Jul. 3, 1989

[51] Int. Cl.$^5$ .............................................. C08F 8/30
[52] U.S. Cl. ..................................... 525/183; 525/178
[58] Field of Search ........................................ 525/183

[56] References Cited

U.S. PATENT DOCUMENTS 2,303,177 11/1942 Schlack ............................... 540/525

Primary Examiner—Ana L. Carrillo
Attorney, Agent, or Firm—Marilyn J. Maue; Joshua J. Ward

[57] ABSTRACT

The invention relates to polymers containing a lactam functionality and having in its molecule repeating units of the general formula:

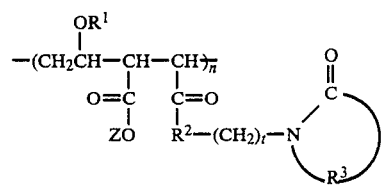

wherein
$R^1$ is $C_1$ to $C_{18}$ alkyl;
$R^2$ is oxygen, sulfur or amino;
$R^3$ is alkylene having 3 to 6 carbon atoms optionally substituted with lower alkyl;
Z is hydrogen, an alkali metal, an alkaline earth metal or ammonia;
n has a value of from 30 to 3,500 and
t has a value of from 2 to 8;

and to the use and synthesis of said polymer.

8 Claims, No Drawings

ALKYL VINYL ETHER POLYMERS CONTAINING A LACTAM FUNCTIONALITY

BACKGROUND OF THE INVENTION

Many water soluble polymers and copolymers in commercial use are employed as antistatic agents and thickeners for various products particularly in the cosmetic and textile finishing arts. However, a good number of these products are subject to yellowing and do not provide the adhesive bond strength required for certain applications. The interpolymer of alkyl vinyl ether and maleic anhydride of 1:1 proportion has excellent film forming and adhesive properties; however, the polymer is subject to embrittlement under certain conditions when stored over an extended period of time. Accordingly, it is an object of this invention to overcome the above deficiencies with polymer having a unique structure and superior properties.

Another object of this invention is to provide polymers capable of forming clear, non-yellowing films characterized by superior adhesive strength which can be employed in pharmaceutical and textile finishing applications.

Still another object of the invention is to provide an economical and commercially feasible method for the preparation of said polymers.

These and other objects of the invention will become apparent from the following description and disclosure.

THE INVENTION

In accordance with this invention there is provided an alkyl vinyl ether/maleic copolymer containing a lactam moiety chemically bonded to the copolymeric backbone and having in its molecule repeating units of the general formula:

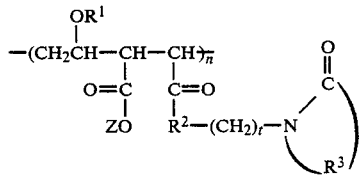

wherein
- $R^1$ is $C_1$ to $C_{18}$ alkyl;
- $R^2$ is —O—, —S—, —NH— or —$NR^4$ where $R^4$ is lower alkyl;
- $R^3$ is alkylene having from 3 to 6 carbon atoms, optionally substituted with lower alkyl;
- Z is hydrogen, an alkali metal, an alkaline earth metal or ammonia;
- n has a value of from 30 to 3,500 and
- t has a value of from 2 to 8.

Preferred of this group are the polymers wherein $R^3$ is unsubstituted propylene or butylene and n has a value of from about 100 to about 500.

As illustrated above, the lactam is not blended with the copolymer but is instead chemically bonded to the polymeric backbone which accounts for the unusually high adhesive strength of the present products as well as their enhanced solubility characteristics.

The polymers of the present invention are water soluble and form clear colorless films which are not subject to yellowing over extended periods. The polymers of higher molecular weight, e.g. 50,000 to 500,000 are excellent thickening and gelling agents for many compositions employed in the fields of cosmetics and commercial detergents. The lactam moiety of the polymer contributes fabric conditioning properties such as an enduring softening effect. In pharmaceutical and agricultural applications, the low toxicity of the present products recommends their use as complexing agents to provide controlled release of active components. In addition to the above enumerated benefits for drug, cosmetic and agricultural delivery systems, it is found that the present polymer inhibits scale deposits in industrial equipment and piping. While the present products are readily soluble in water, they resist attack by many commercial solvents including ethanol, ethyl acetate, tetrahydrofuran, ketones such as acetone methyl ethyl ketone and alkanes such as hexane. This property is particularly unexpected since both the lactam and the alkyl vinyl ether—maleic anhydride copolymers are soluble in these chemicals. Other general uses include their applications as solubilizers and dispersing agents and will become apparent from this disclosure.

Copolymers of maleic anhydride and alkylvinylether of the formula:

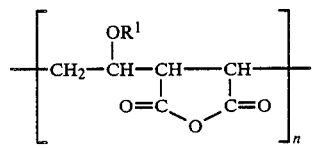

wherein $R^1$ is lower alkyl, preferably methyl, and n represents a positive integer having a value of from 30 to 3500 are particularly useful. These copolymers generally have a molecular weight of from about 5000 to about 500,000 and a specific viscosity within the range 0.1 to 4 centistrokes, and preferably from 0.1 to 2 centistrokes (determined in a 1% methylethyl ketone solution), such as GANTREZ AN-119 (specific viscosity 0.1–0.5 centistokes), GANTREZ AN-139 (specific viscosity 1.0–1.4 centistokes), and GANTREZ AN-169 (specific viscosity 2.6–3.5), all made by GAF Corporation. GANTREZ is a registered trademark of GAF Corporation.

In general, the polymers of the present invention are prepared by the reaction between a lactam of the formula

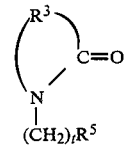

where $R^5$ is —OH, —SH, —$NH_2$ or —$NHR^4$ is lower alkyl, with an alkyl vinyl ether/maleic anhydride copolymer having in its molecule repeating units of the formula:

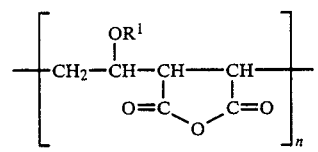

wherein $R^3$, $R^1$, t and n are as defined above, to produce the corresponding half acid product having in its molecule repeating units of the formula:

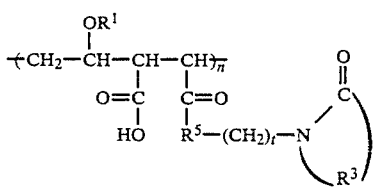

The half acid is optionally reacted with ammonium hydroxide, an alkali metal compound or an alkaline earth metal compound such as an oxide, hydroxide or carbonate of these metals to yield the corresponding salt product or a product containing a mixture of salt and acid units in the polymer.

These reactions are affected at a temperature of between about 20° C. and about 100° C. for a period of from about 20 minutes to about 5 hours under from about 0 to about 50 psig., preferably at a temperature of between about 30° C. and about 75° C. for 2 to 4 hours under atmospheric pressure.

In the synthesis process, it is recommended that the alkyl vinyl ether-maleic anhydride copolymer, for example GANTREZ ® AN, be dissolved in an inert solvent such as for example, methylethyl ketone, ethyl acetate, tetrahydrofuran, acetone, chloroform, etc. and mixtures thereof to provide a solution containing between about 6 and about 30% by weight, preferably between about 15 and about 25% by weight polymer. The lactam, in the liquid phase, is then gradually added to the polymer solution. When a normally solid lactam is employed, it is recommended that it be predissolved before introduction in an inert solvent, preferably in the same solvent.

The reaction is carried out in an oxygen-free atmosphere with constant agitation. The mole ratio of lactam to maleic anhydride unit is as close to stoichiometry, e.g. about 1:1, as is convenient to maintain since excess lactam results in product containing unreacted starting material. On the other hand, excess polymer produces a terpolymeric product containing units of the acid, the half acid and the vinyl ether-maleic anhydride, which terpolymers are outside the scope of this invention.

On completion of the reaction, the precipitated product is separated from the reaction mixture by filtration, after which it is washed with the selected solvent and dried for solvent removal. The drying step can be carried out under vacuum or the product can be air dried at room temperature or slightly elevated temperature up to about 60° C. for a period of up to about 20 hours.

The present polymeric products form excellent protective non-yellowing coatings when applied to a substrate such as plastic, wood, textiles, ceramic, glass, metal, etc. in a thickness of from about 0.1 to 10 mils. These coatings possess strong adhesion to the substrate surface and are resistant to abrasion. The coating mixtures comprise between about 5 and about 25 wt. % of the polymer in an inert carrier such as water, ethanol, methanol, isopropanol, and the like and can be sprayed or coated with a doctor blade on a surface.

Having thus generally described the invention, reference is now had to the accompanying examples which illustrate preferred embodiments of the invention but which are not to be construed as limiting to the scope thereof as more broadly described above and as set forth in the appended claims.

EXAMPLE 1

A glass reactor is equipped with a dropping funnel, mechanical stirrer and a nitrogen sparge and contains 312.3 grams (2 moles) of GANTREZ ® AN-119 (average MW ~20,000) in 600 ml of acetone and 1000 ml of ethyl acetate. Then 252 grams (2 moles) of 2-amino ethyl-2-pyrrolidone in 200 ml ethyl acetate solution was introduced at a temperature of 50° C. under nitrogen atmosphere. An immediate product precipitate was formed upon contact of the reactants. Stirring of the reaction mixture was continued for one hour at 50° C. after which the mixture was allowed to cool to room temperature for about 1 hour. The product precipitate was filtered under suction, washed with 100 ml ethyl acetate and dried under vacuum at 40° C. for 16 hours. The polymeric product,

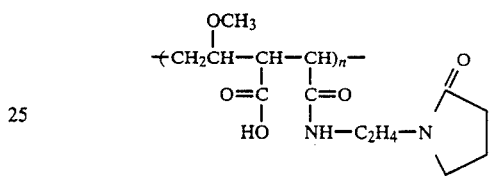

had a number average molecular weight of about 32,000 and was recovered in 95.4% yield. The product was soluble in water, methanol and dimethyl sulfoxide but was found to be insoluble in ethanol, acetone, chloroform, hexane and ethyl acetate.

The structure of the product was confirmed by Spectral Analysis (IR, $^1$H and $^{13}$C NMR) and wet analysis, i.e. titration with 0.1 N NaOH, and nitrogen analysis.

A strong transparent film of the product was obtained by dissolving it in 4 ml of methanol and casting on a glass substrate. The film, observed after one month, showed no signs of yellowing or diminished clarity.

EXAMPLE 2

The reaction of Example 1 was repeated except that the GANTREZ AN-139 (Av. MW 41,000) was substituted for GANTREZ AN-119. The polymeric product (Av. MW 66,000) was obtained in 97.4% yield.

EXAMPLE 3

The reaction of Example 1 was repeated except that the GANTREZ AN-149 (Av. MW 50,000) was substituted for GANTREZ AN-119. The polymeric product (Av. MW 81,000) was obtained in 96.3% yield.

EXAMPLE 4

The reaction of Example 1 was repeated except that the GANTREZ AN-169 (Av. MW 67,000) was substituted for GANTREZ AN-119 and 800 ml acetone and 1.5 liters of ethyl acetate was used. The polymeric product (Av. MW 100,000) was obtained in 95.8% yield.

EXAMPLE 5

The polymeric product of Example 1 is neutralized to pH of about 6.5 by mixing with a 30% solution of sodium carbonate in water. The solution is held for 0.5 hour at 40°–50° C. to ensure complete mass transfer.

The resulting sodium salt solution of the polymer is then oven dried and ready for use as a thickening agent or viscosity builder.

EXAMPLE 6

Example 5 was repeated except that the sodium carbonate was contacted with the polymer of Example 1 for a period of only 10 minutes. The resulting product was a polymer containing the acid units of Example 1 and the sodium salt units of Example 5 in a 2:1 ratio.

It will be understood that other salts or salt mixtures can be prepared by the procedures of Examples 5 and 6 by substituting the salt forming reactant. Such salt forming reactants include magnesium hydroxide, sodium hydroxide, potassium hydroxide, ammonium hydroxide, potassium carbonate, calcium carbonate solutions, zinc oxide slurry, etc.

EXAMPLE 7

The reaction of Example 1 was repeated except that the lactam used was 3-aminopropyl-2-pyrrolidone. The corresponding polymeric product was obtained in 96.2% yield.

EXAMPLE 8

The reaction of Example 1 was repeated except that the lactam used was 3-aminopropyl caprolactam. The corresponding polymeric product was obtained in 96.9% yield.

EXAMPLE 9

A glass reactor, equipped with a dropping funnel, mechanical stirrer and nitrogen sparge, containing 2 moles of GANTREZ ® AN-139 in 600 ml of acetone and 1,000 ml of ethyl acetate is reacted with 2 moles of 4-hydroxybutyl-2-pyrrolidone, in the presence of a catalytic amount of concentrated $H_2SO_4$, at 60° C. under a blanket of nitrogen with constant stirring over a period of four hours. The polymeric product

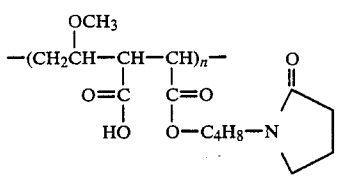

is recovered by filtration in greater than 90% yield.

EXAMPLE 10

Example 1 is repeated except that 3-mercaptoethyl-2-pyrrolidone is substituted for 4-hydroxybutyl-2-pyrrolidone. The polymeric product

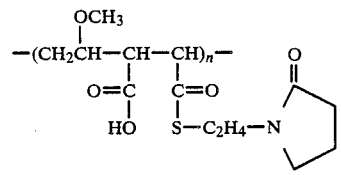

is recovered by filtration in greater than 90% yield. Solutions of all of the above compounds can be coated on a substrate to provide an abrasive resistant non-yellowing film having good surface substantivity.

What is claimed is:

1. A polymer of an alkyl vinyl ether containing a lactam functionality and having in its molecule repeating units of the formula

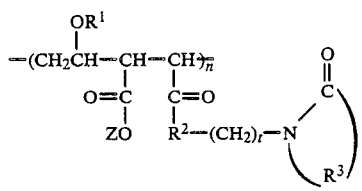

wherein
R$^1$ is C$_1$ to C$_{18}$ alkyl;
R$^2$ is oxygen, sulfur or amino;
R$^3$ is alkylene having from 3 to 6 carbon atoms optionally substituted with lower alkyl;
Z is hydrogen, an alkali metal, an alkaline earth metal, or ammonia;
n has a value of from 30 to 3,500 and
t has a value of from 2 to 8.

2. The polymer of claim 1 wherein R$^3$ is propylene.
3. The polymer of claim 1 wherein n has a value 100 to 500.
4. The polymer of claim 1 having in its molecule repeating units of the formula

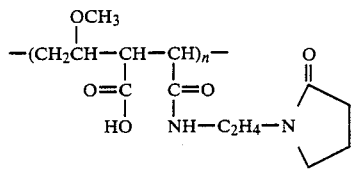

5. The polymer of claim 1 having in its molecule repeating units of the formula

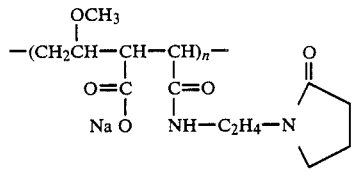

6. The polymer of claim 1 wherein R$^1$ is methyl, Z is hydrogen, R$^2$ is —NH and R$^3$ is propylene.
7. The polymer of claim 1 wherein R$^1$ is methyl, Z is hydrogen, R$^2$ is —NH and R$^3$ is butylene.
8. The polymer of claim 1 wherein the number average molecular weight of the polymer is between about 30,000 and about 120,000.

* * * * *